United States Patent

Grouffal et al.

[11] Patent Number: 5,563,847
[45] Date of Patent: Oct. 8, 1996

[54] SEISMIC SIGNAL ACQUISITION METHOD AND DEVICE

[75] Inventors: Christian Grouffal, Rueil-Malmaison; Joseph Rialan, Meudon, both of France

[73] Assignee: Institut Francais du Petrole, Rueil Malmaison, France

[21] Appl. No.: 315,592

[22] Filed: Sep. 30, 1994

[30] Foreign Application Priority Data

Sep. 30, 1993 [FR] France .................. 93 12249

[51] Int. Cl.⁶ .................. G01V 1/00; G08C 15/00
[52] U.S. Cl. .................. 367/65; 367/67; 340/870.11; 340/870.15; 340/870.18
[58] Field of Search .................. 367/65, 66, 67; 340/870.18, 870.11, 870.15

[56] References Cited

U.S. PATENT DOCUMENTS

| | | | |
|---|---|---|---|
| 4,031,504 | 6/1977 | Mioduski | 340/15.5 |
| 4,378,527 | 3/1983 | Beauducel et al. | 367/67 |
| 4,449,120 | 5/1984 | Rialan et al. | 367/67 |
| 4,610,006 | 9/1986 | MacDonald | 367/65 |
| 4,616,349 | 10/1986 | Shirley | 367/66 |
| 4,636,993 | 1/1987 | Lumley et al. | 367/65 |
| 4,779,055 | 10/1988 | Beauducel et al. | 367/67 |
| 4,901,289 | 2/1990 | Cretin et al. | 367/34 |

FOREIGN PATENT DOCUMENTS

| | | |
|---|---|---|
| 0562939 | 9/1993 | European Pat. Off. . |
| 2441956 | 6/1980 | France . |
| 2538561 | 6/1984 | France . |
| 2599533 | 12/1987 | France . |
| 2627652 | 8/1989 | France . |
| 2666946 | 3/1992 | France . |
| 1239585 | 7/1971 | United Kingdom . |

Primary Examiner—Michael J. Carone
Assistant Examiner—Theresa M. Wesson
Attorney, Agent, or Firm—Antonelli, Terry, Stout & Kraus

[57] ABSTRACT

The arrangement in the field of seismic emission-reception system changes as it progrsses along the profile explored, which modifies the respective distances between the source of seismic signals (S) and each of the siesmic receivers (Ri). In order to take account thereof, each of the acquisition boxes (Bi) used in the field for amplifying, digitizing and storing the siesmic signals received during each emission-reception cycle (or possibly a central station) is provided with a processor for determining automatically the gain to be assigned to the various amplifiers from all of the signals acquired and with selection rules taking into account the level of the signals and their evolution observed over several successive emission-reception cycles. The invention has an application in decentralized automatic control of acquisition devices.

19 Claims, 2 Drawing Sheets

SEISMIC SIGNAL ACQUISITION METHOD AND DEVICE

FIELD OF THE INVENTION

The present invention relates to an acquisition method and device for signals picked up by seismic receivers with a cyclic matching of the amplifiation gains applied.

The invention is more particularly suited to acquisition chains where digitizing of the signals is performed continuously by using sigma-della type converters.

BACKGROUND OF THE INVENTION

Current seismic prospecting methods include the use of acquisition devices distributed over a zone to be explored. They are intended each for collecting the signals received by at least one receiver such as geophones or hydrophones coupled to the ground, in response lo seismic signals emitted by a seismic source and sent back through subsoil discontinues. The signals are amplified, digitized and stored in local memories prior to being transmitted in real or delay in time to a central station through a transmission channel such as a cable, an optical fiber, a Rf channel, etc.

Seismic acquisition and transmission systems are for example described in patents FR-A-2,627,652 corresponding to U.S. Pat No. 4,908,803, FR-A-2,599,533 corresponding to U.S. Pat. No. 4,815,044, FR-A-2,538,561 corresponding to U.S. Pat. No. 4,979,152, or in patent application Ser. No. FR 92/12388 corresponding to U.S. Patent application Ser. No. 08/135,399 filed by the Applicant.

Data acquisition systems may include an automatic gain control suited to the type of digitizing apparatus used, allowing to be taken of the advantage of their conversion dynamic range, which is often high. Digitizing the signals in conventional acquisition chains is generally performed by taking successive samples from the analog signals by means of sample-and-hold circuits, and by applying them to an analog-to-digital converter. The gain may be adjusted by proceeding for example as described in patent FR-A-2,441,956 filed by the assignee. A steady gain is first being applied to a sample, followed by determining according to the corresponding digital word an optimum gain which has to be subsequently applied thereto to gain a full-resolution digital word.

In the most recent acquisition systems, the seismic signals are digitized by means of the oversampling technique. A sigma-delta type modulator oversamples the analog signals applied thereto and produces, at a high frequency, low-resolution digital words. A filter called a decimation filter is used for performing a sliding stacking of a certain number n of digital words from the modulator and for producing digital words of a higher resolution and at a lower frequency. A digitizing set of ibis type is for example described in patent FR-A-2,666,946 filed by the assignee.

The use of these delta-sigma modulators oversampling the signals continuously does not allow preamplifier gain controls to be achieved at each held sample as was the case with the prior digitizing apparatus.

However, it is not possible in practice to impose a common gain value on the acquisition preamplifiers from a central station, notably because of the changes in to the emission-reception system during a single prospecting session. For some configurations, the seismic receivers which are the closest to the seismic source have an optimum gain and all of the conversion dynamic range of the converter (the signals they produce are coded with 24 bits for example). The seismic signals picked up by receivers which are further away from the source are weaker and are coded with a much smaller number of bits (10 to 13 for example). The seismic source is progressively shifted along the profile during a single recording session and previous distances between the source and the various receivers change which consequently modifies the conversion dynamic range effectively applied to a single "trace" during the successive cycles.

SUMMARY OF THE INVENTION

The acquisition method according to the invention allows a cyclic matching of the gain applied to seismic signals to be achieved automatically at regular time intervals, depending on the duration of the successive seismic emission-reception cycles performed (which are of the order of several seconds in actual practice), these signals being collected by an acquisition device including at least one acquisition apparatus arranged in an exploration zone to collect the signals received by at least one seismic pickup coupled to the formations in response to seismic signals applied by a source. This apparatus includes at least one amplifier associated with gain switching circuits for applying a certain number p of different amplification gains ($g1, g2 \ldots gp$) to the seismic signals, digitizing circuits of the oversampling type producing successive digital words (representative of digitized samples), a storage for storing digital words and a control including a processing unit.

The method includes:

selecting, from the digital words produced at least during a cycle by each acquisition apparatus, a digital word representative of energy of at least one received seismic signal, comparing the selected digital word with several digital words representative of threshold values defining several ranges on a variable scale allowable by a digitizing device.

selecting, according to the range, an optimum gain value applicable to the amplifier for at least one later cycle, and controlling the switching circuits to apply this optimum gain value.

According to an embodiment, of the invention the method includes selecting a gain value as a function of several digital words selected after several successive cycles.

According to another embodiment of the invention, the method includes selecting an optimum gain value as a function of variations, within the ranges observed over several successive cycles, of the value of the digital words selected whether, be they are direction and/or amplitude variations.

According to another embodiment of the invention, in case every acquisition apparatus collects several signals picked up by several receivers, the optimum gain is chosen as a function of several selected digital words corresponding to several of these signals, so as to better take into account coupling defects or disparities of the receivers with the ground.

Digital word comparisons may be achieved as they are produced or at the end of the cycles, over a selected time interval.

Application of the method of the invention automatic matching of the amplification gain of each acquisition chain, at regular intervals. This matching is preferably achieved between all the consecutive emission-reception cycles, i.e. in practice at intervals of several seconds. This allows notably to take into account changes in the arrangement of the seismic emission-reception set which is shifted in the field as it progresses along a seismic profile studied.

The acquisition device for implementing the method according to the invention includes at least one acquisition apparatus arranged in an exploration zone for collecting the signals received by at least one seismic receiver coupled to the formations in response to the seismic signals applied thereto this apparatus including at least one amplifier associated with gain switching circuits for applying to the seismic signals a certain number p of different amplification gains, g1, g2 ... gp, a digitizing device of the oversampling type producing successive digital words (representative of digitized samples), storage for storing digital words, a control including a processing unit, and a transmission device for transmitting data on a transmission channel.

The invention is characterized in that it includes gain control for:

selecting, from the digital words produced by each acquisition apparatus, at least during one cycle, a digital word representative of the energy of the seismic signals received by each acquisition apparatus, comparing the digital word selected with several digital words representative of threshold values defining several ranges on a variable scale allowable by the digitizing means, selecting, according to the range, an optimum gain value applicable to the amplifier for at least one later cycle, and controlling switching circuits to select the optimum gain value.

The gain control is suited for selecting a gain value according to several digital words selected at the end of several successive cycles, or according to the value variations of the digital words selected within the ranges, between several successive cycles.

The control is preferably arranged in each acquisition apparatus rather than in the central station. High-rate data transfers towards the central station, which would otherwise be necessary, are avoided thereby.

BRIEF DESCRIPTION OF THE DRAWINGS

Other features and advantages of the method and of the device according to the invention will be clear from reading the description hereafter of embodiments given by way of non limiting examples, with reference to the accompanying drawings in which.

DESCRIPTION OF THE PREFERRED EMBODIMENTS

Figure 1:
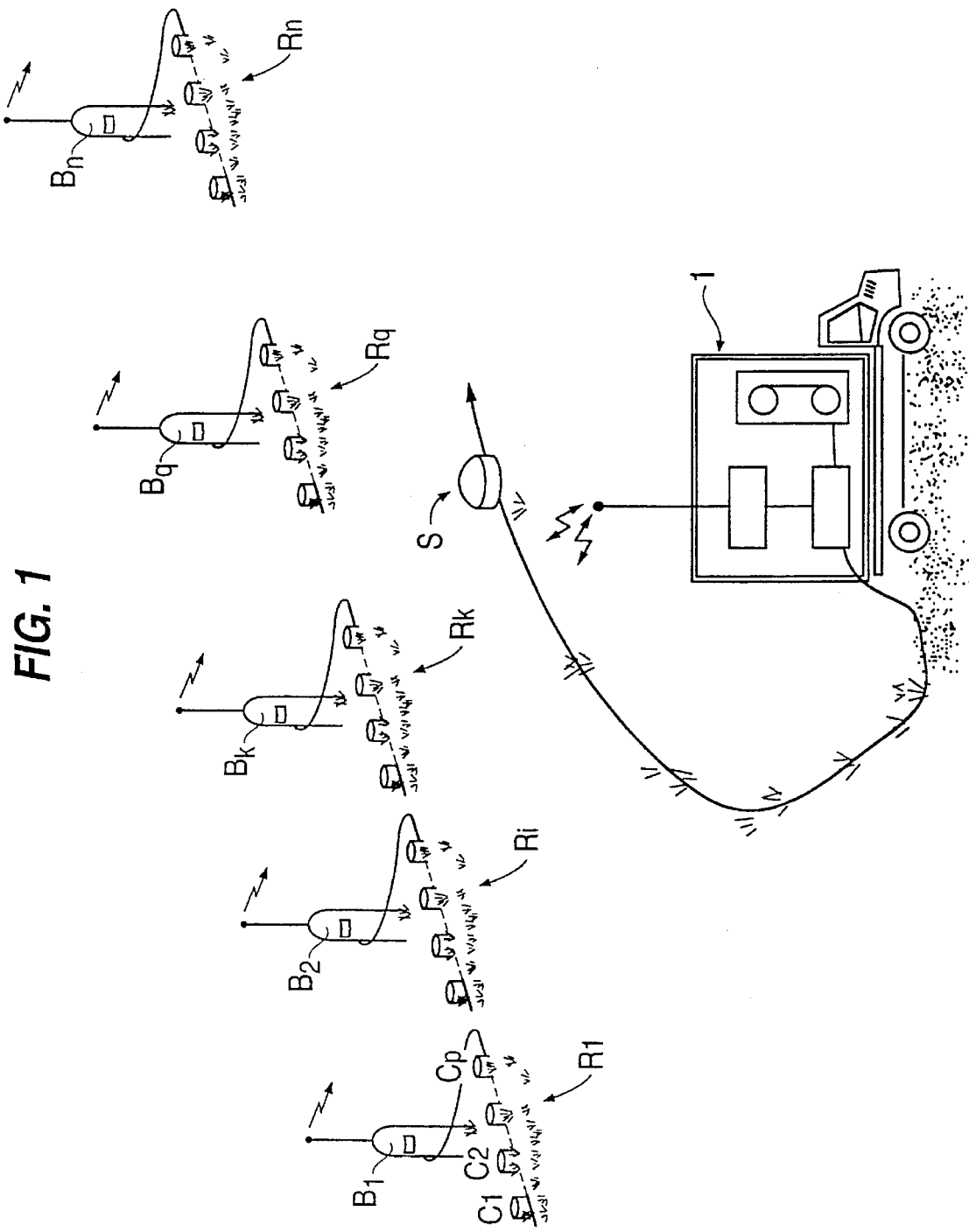
FIG. 1 diagrammatically shows a distribution of a seismic emission-reception system in the field, and FIG. 2 diagrammatically shows an acquisition apparatus provided with a processor means suited for performing the cyclic matching of the gain applied.

A seismic prospecting set is used in a field as illustrated in FIG. 1, including a source of seismic waves S such as a vibrator or an impulse source of a well-known type, and a reception and acquisition system for collecting the signals received by a large number of receivers (or traces) R1, R2 ... Rn which are distributed along a seismic profile to be explored. Each of these receivers consists most often of a group of interconnected elementary pickups. The seismic signals received are applied to a plurality of acquisition located in apparatus boxes B1, B2 ... Bn. These plurality of apparatus collect the signals prior to transmitting them to a central control and recording station 1 placed in a vehicle.

The seismic exploration of a seismic profile includes achieving at least one emission-reception cycle for each position of the source S and shifting the source progressively along this profile. When the source is shifted, it is for example moved away from the acquisition boxes B1 to Bk and from the associated seismic receivers R1 to Rk, and it is moved closer to the receivers associated with the others (Bk+1 to Bn). The amplitude of the waves picked up by the various receivers may thus vary significantly as each exploration session progresses.

The method according to the invention allows the amplitude variations linked notably to these shiftings to be automatically balanced. It is implemented automatically by the plurality of acquisition apparatus such as those described hereafter.

Figure 2:
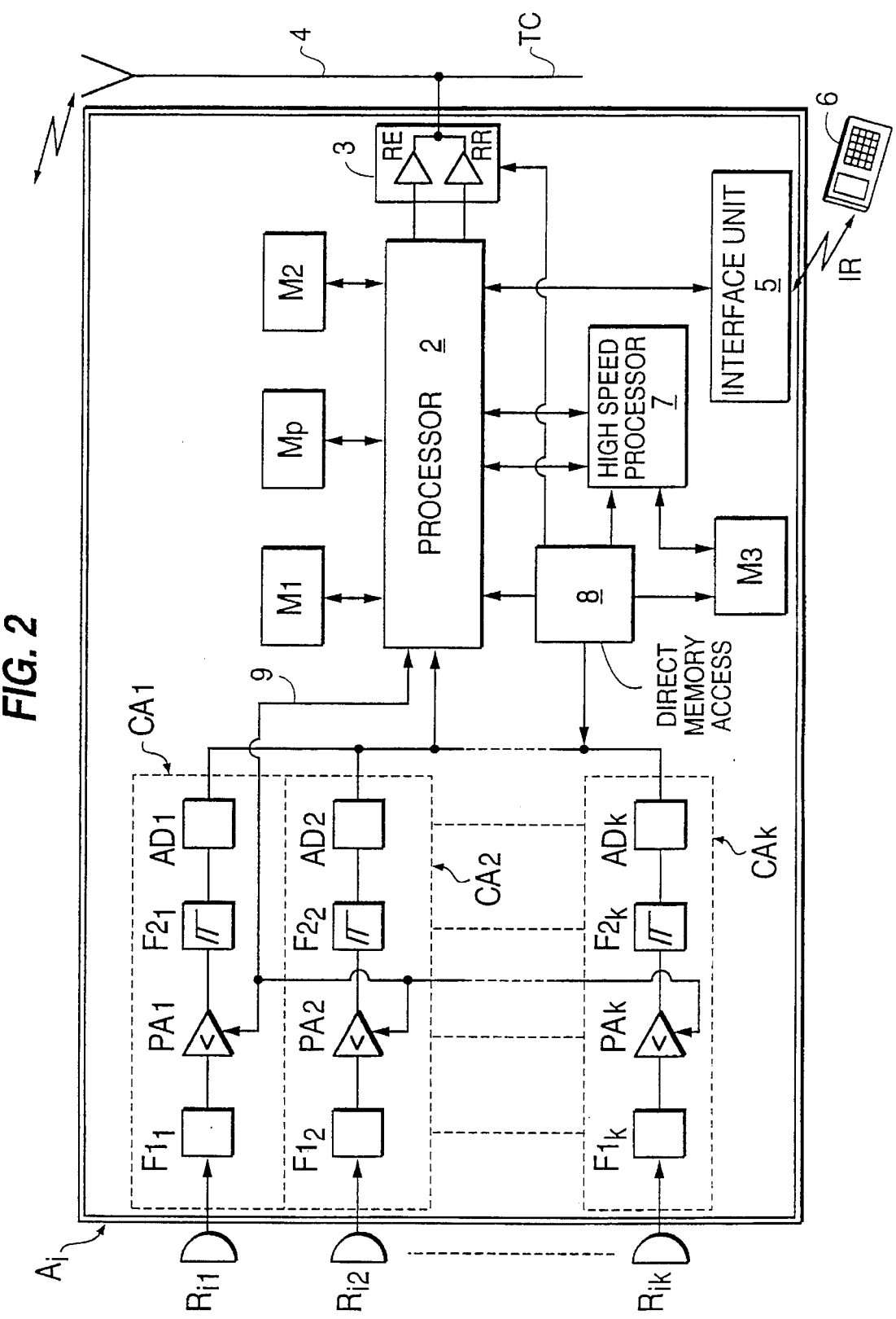

The acquisition apparatus Ai illustrated in FIG. 2 is located in each acquisition box BI to Bn and is suited for collecting the signals received by a single receiver R as shown in FIG. 1 or more generally by a certain number k of various receivers $R_{i1}$... $R_{ik}$, as shown in FIG. 2. The purpose of each acquisition apparatus Ai is to digitize the signals of the associated receivers and to store them. The central station 1 controls the successive triggerings of source S, the acquisition by the various plurality of apparatus the signals sent back through the subsoil discontinuities and received by receivers R1 to Rn, and thereafter the centralization of the data stored. A response to the order of central station 1, each acquisition apparatus in boxes B1 to Bn transfers to the central station the data stored therein by means of the appropriate, communication channel. The acquisition systems described in the patents cited above, provided with the modifications peculiar to the invention and which are described hereunder, may be advantageously used therefore.

Each acquisition apparatus Ai thus includes for example k acquisition chains CA1 to CAk receiving respectively the k signals and including each a low-pass filter F11, F12 ... Flk of the VHF type, an amplifier PA1, PA2 ... PAk whose gain is selected to take one of several different gain values (4 values g1, g2, g3, g4 for example of respectively 12, 24, 36 and 48 dB) through the switching of counterreaction networks (not shown), a high-pass filter F21, F22 ... F2k and an analog-to-digital converter (CAN) $AD_1$, $AD_2$, ... $AD_k$ for converting the amplified and filtered analog signals into digital words. Digitizing is provided by sigma-delta type modulators associated with decimalion fillers as described in patent application FR-A-2,666,946 cited above.

The outputs of all the chains CA1 to CAk are connected to a management microprocessor 2 processing the 16 to 32-bit digital words, which is programmed to manage the acquisition and exchanges with the central station 1. Two memory blocks M1 and M2 and a memory Mp for the programs are associated with microprocessor 2. Processor 2 is connected to a radio or a wire line emission-reception unit 3 connected to the channel used for communication with the central station 1 (FIG. 1). If it is a radio channel, unit 3 includes a radio transmitter RE and a radio receiver RR communicating with an antenna 4. An interface unit 5 described in patent FR-2,608,780 cited above also allows an infrared-ray communication with an initialization box 6 by means of which an operator may possibly communicate to management processor 2 addressing and selection instructions relative to working parameters of the acquisition chains, as well as identification numbers assigned to the acquisition apparatus considering its position along the seismic profile studied.

Each acquisition apparatus Ai preferably includes a high-speed processor 7 specialized in certain computations. It may be, for example, a floating point 32-bit processor of the Digital Signal Processor 96002 type manufactured by Motorola, which is associated with a Direct Memory Access type device 8 for accelerating data block transfers between the two processors 2 and 7. A working memory M3 is added to processor 7. Each acquisition apparatus also includes a self-contained power supply, Processor 2 performs a major part of the processing. Its function is to decode the commands transmitted by central station 1 and to manage:

the acquisition of the signals of receivers $R_{i1}$ to $R_{ik}$ by the various acquisition chains, transmissions in connection with unit 3, memories M1 and M2 for the temporary storage of data, inputs-outputs, interruptions between programs and, exchanges with computing processor DSP 7, etc.

The method according to the invention mainly consists, as stated above, in selecting the greatest amplitude take of a seismic signal collected during a seismic emission-reception cycle with a determined gain and, according to its level within a variation scale allowable by a digitizing set, in adjusting the new gain which will be possibly applied thereto during the next cycle for example.

The previous gain selection and adjustment operations are performed by the specialized processor 7 on the order of management processor 2.

Processor 7 successively compares all the digital words formed during a single emissions-reception cycle, representative of at least one signal collected (coming for example from the acquisition chain CA1). The digital word of greatest amplitude Sm is selected at the end of each cycle by sorting the words successively generated by the oversampling converter $AD_1$ considered, and stored in memories M1 and M2.

According to a first embodiment, processor 7 compares the absolute value of each amplitude Sm with several digitized threshold values s1, s2 . . . Sp of unequal amplitudes.

Three threshold values s1, s2=s1/4, s3=s1/16 are for example chosen and the gain to be applied to the amplifier is selected according to the following criteria:

| VARIATION RANGE | GAIN APPLIED |
| --- | --- |
| s1 < Sm | G = g1 |
| s2 < Sm < s1 | G = g2 |
| s3 < Sm < s2 | G = g3 |
| Sm < s3 | G = g4 |

According to another embodiment, the gain selection is obtained more accurately by taking into account not only the position of the amplitude Sm with respect to the threshold values, but also its variation in direction within the ranges defined by the threshold values, and possibly in a module. The direction and the amplitude of these variations are detected by comparing at least two successive cycles.

Six threshold values are for example chosen: s1, s2=s1/2, s3=s1/2, s4 =s1/8, s5=s1/16 and s6=s1/32, and the gain to be applied to the amplifier is selected according to the following criteria:

| VARIATION RANGE | TENDENCY INCREASE = + DECREASE = − | GAIN APPLIED |
| --- | --- | --- |
| s1 < Sm | | g = g1 |
| s2 < Sm < s1 | + | g = g1 |
| | − | g = g2 |
| s3 < Sm < s2 | | g = g2 |
| s4 < Sm < s3 | + | g = g2 |
| | − | g = g3 |
| s5 < Sm < s4 | | g = g3 |
| s6 < Sm < s5 | + | g = g3 |
| | − | g = g4 |

The processor may also take into account not only the direction of variation within a range (+ or−), but also wait until the amplitude exceeds a certain set increment before it intervenes to change the gain to be applied to the amplifier.

When the most appropriate gain has been selected from the signal coming from reference chain CA1, processor 2 orders (through linking conductors 9) the switching of the gain adjusting circuits associated with all the amplifiers PA1 to PAk of the acquisition apparatus.

According to a modification of the previous embodiment, processor 7 performs the previous operations on the signals coming from all acquisition chains and selects the gain as a function of one of the digital words selected. The acquisition apparatus may thus better take account of disparities between receivers and/or of possible coupling defects of the various pickups with the ground, which may modify the level of the signals picked up.

In order to initialize the acquistion apparatus, the central station or the operator in the field imposes a standard gain value. The most appropriate gain value is determined nearly instantaneously at the end of the first seismic cycle and readjusted at all the following cycles if necessary.

We claim:

1. An acquisition method for seismic signals emanating from subterranean formations in response to seismic waves applied by a seismic source during successive seismic emission-reception cycles with each cycle having a determined duration, the seismic signals being sensed by seismic receivers spaced apart on a field, the receivers producing signals which are collected by at least one acquisition apparatus arranged on the field including at least one amplifier, each amplifier having a gain switching circuit for selectively applying to the seismic signals one of a plurality of different amplification gains, an oversampling digitizing apparatus producing successive digital words, a storage for storing the successively produced digital words, and a control including a processing unit for automatically cyclically matching the applied gain to the seismic signals at regular time intervals depending on the duration of the emission-reception cycles, said method comprising:

selecting from the digital words produced by each acquisition apparatus, at least during one cycle, a digital word representative of the maximum energy of at least one sensed seismic signal;

comparing the selected digital word selected with several digital words representative of threshold values defining several ranges of a variable scale selectible by the digitizing apparatus for digitizing digital words to identify one of the several ranges having a threshold value closest to the selected digital word;

selecting, according to the selected range, a gain value to be applied by the at least one amplifier for amplifying the signals at least one later cycle; and controlling the gain switching circuit of each amplifier to apply the selected gain value to the collected signals.

2. A method as claimed in claim 1, comprising:

selecting the gain value as a function of several digital words selected at the end of several of the successive cycles.

3. A method as claimed in claim 2, comprising:

selecting a gain value as function of several selected digital words corresponding respectively to several signals received by a single acquisition apparatus.

4. A method as claimed in claim 2, wherein:

a digital word representative of the maximum energy of the received signals by comparing the digital words successively produced during a selected time interval.

5. A method as claimed in claim 2, wherein:

a digital word representative of the maximum energy of the received signals is selected by comparing directly the digital words successively produced during a selected time interval.

6. A method as claimed in claim 1, comprising:

selecting the gain value depending on variations of the digital words selected within the ranges defined by the threshold values during several successive cycles.

7. A method as claimed in claim 6, wherein:

the gain value is selected as a function of a direction and amplitude of a variation of the digital words.

8. A method as claimed in claim 6, comprising:

selecting a gain value as a function of several selected digital words corresponding respectively to several signals received by a single acquisition to several.

9. A method as claimed in claim 6, wherein:

a digital word representative of the maximum energy of the received signals is selected by comparing the digital words successively produced during a selected time interval.

10. A method as claimed in claim 6, wherein:

a digital word representative of the maximum energy of the received signals is selected by comparing directly the digital words successively produced during a selected time interval.

11. A method as claimed in claim 7, comprising:

selecting a gain value as a function of several selected digital words corresponding respectively to several signals received by a single acquisition apparatus.

12. A method as claimed in claim 7, wherein:

a digital word representative of the maximum energy of the received signals is selected by comparing the digital words successively produced during a selected time interval.

13. A method as claimed in claim 7, wherein:

a digital word representative of energy of the received signals is selected by comparing directly the digital words successively produced during a selected time interval.

14. A method as claimed in claim 1, comprising:

selecting a gain value as a function of several selected digital words corresponding respectively to several signals received by a single acquisition apparatus.

15. A method as claimed in claim 14, wherein:

a digital word representative of the maximum energy of the received signals is selected by comparing directly the digital words successively produced during a selected time interval.

16. A method as claimed in claim 1, wherein:

a digital word representative of the maximum energy of the received signals is selected by comparing directly the digital words successively produced during a selected time interval.

17. A method as claimed in claim 1, wherein:

a digital word representative of the maximum energy of the received signals is selected by comparing the digital words produced during a selected time interval at an end of each cycle.

18. An acquisition device for seismic signals emanating from subterranean formations in response to seismic waves applied by a seismic source during successive seismic emission-reception cycles with each cycle having a determined duration, the seismic signals being sensed by seismic receivers spaced apart on a field, at least one acquisition apparatus arranged on the field for collecting the seismic signals including at least one amplifier associated with gain switching circuits for applying to the seismic signals one of a plurality of different amplification gains, oversampling digitizing apparatus producing successive digital words, a storage for storing digital words, and a control including a processing unit and a transmitter for transmitting data on a transmission channel, the at least one amplifier comprising:

means for selecting from the digital words produced by each acquisition apparatus, at least during one cycle, a digital word representative of a maximum energy of at least one sensed seismic signal;

means for comparing the selected digital word with several digital words representative of threshold values defining several ranges of a variable scale selectible by the digitizing apparatus for digitizing the digital words to identify one of the several ranges having a threshold value closest to the selected digital word;

means for selecting, according to the selected range, a gain value to be applied for amplifying the signals at least one later cycle; and means for controlling gain to apply the gain value to the collected signals.

19. A device as claimed in claim 18, wherein:

each acquisition apparatus includes a processing unit for selecting the digital words.

* * * * *